United States Patent
Li et al.

(10) Patent No.: US 9,915,787 B2
(45) Date of Patent: Mar. 13, 2018

(54) OPTICAL COUPLING DEVICE, PHOTONIC INTEGRATED CIRCUIT, AND METHOD OF FORMING AN OPTICAL COUPLING DEVICE

(71) Applicant: Agency for Science, Technology and Research, Singapore (SG)

(72) Inventors: Chao Li, Singapore (SG); Patrick Guo-Qiang Lo, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 14/915,760

(22) PCT Filed: Sep. 17, 2014

(86) PCT No.: PCT/SG2014/000441
§ 371 (c)(1),
(2) Date: Mar. 1, 2016

(87) PCT Pub. No.: WO2015/047193
PCT Pub. Date: Apr. 2, 2015

(65) Prior Publication Data
US 2016/0202423 A1    Jul. 14, 2016
US 2017/0075073 A2    Mar. 16, 2017

(30) Foreign Application Priority Data
Sep. 26, 2013  (SG) .............................. 201307267-3

(51) Int. Cl.
G02B 6/00    (2006.01)
G02B 6/34    (2006.01)
(Continued)

(52) U.S. Cl.
CPC ............... *G02B 6/34* (2013.01); *G02B 6/124* (2013.01); *G02B 6/126* (2013.01); *G02B 6/13* (2013.01);
(Continued)

(58) Field of Classification Search
CPC combination set(s) only.
See application file for complete search history.

(56) References Cited

U.S. PATENT DOCUMENTS 8,594,503 B2 * 11/2013 Roelkens ........... G02B 6/12007
                                                    385/15
8,676,003 B2 *  3/2014 Roelkens ............. G02B 6/2793
                                                    385/14
(Continued)

OTHER PUBLICATIONS

Sipe et al., "Propagation Through Nonuniform Grating Structures," Journal of the Optical Society of America, vol. 11, No. 4, Apr. 1994, pp. 1307-1320.
(Continued)

*Primary Examiner* — Sung Pak
(74) *Attorney, Agent, or Firm* — Winstead, P.C.

(57) ABSTRACT

According to embodiments of the present invention, an optical coupling device is provided. The optical coupling device includes a substrate, and a grating arrangement including a plurality of grating elements, the plurality of grating elements being defined on one surface of the substrate, wherein the plurality of grating elements are arranged to have a first period along a first direction, and a second period along a second direction orthogonal to the first direction, the first period being different from the second period. According to further embodiments of the present invention, a photonic integrated circuit and a method of forming an optical coupling device are also provided.

17 Claims, 7 Drawing Sheets

(51) Int. Cl.

| | | |
|---|---|---|
| *G02B 6/124* | (2006.01) | |
| *G02B 6/30* | (2006.01) | |
| *G02B 6/293* | (2006.01) | |
| *G02B 6/126* | (2006.01) | |
| *G02B 6/27* | (2006.01) | |
| *G02B 6/42* | (2006.01) | |
| *G02B 6/13* | (2006.01) | |
| *G02B 6/12* | (2006.01) | |

(52) U.S. Cl.
CPC ....... *G02B 6/2726* (2013.01); *G02B 6/29329* (2013.01); *G02B 6/30* (2013.01); *G02B 6/4215* (2013.01); *G02B 2006/12061* (2013.01)

(56) References Cited

U.S. PATENT DOCUMENTS

| | | | | |
|---|---|---|---|---|
| 9,195,079 | B2* | 11/2015 | Doerr | G02F 1/011 |
| 2002/0126942 | A1* | 9/2002 | Evans | G02B 6/12007 |
| | | | | 385/14 |
| 2009/0290217 | A1 | 11/2009 | Hoose | |
| 2010/0142892 | A1 | 6/2010 | Kuittinen et al. | |
| 2010/0278484 | A1 | 11/2010 | Scheerlinck et al. | |
| 2010/0322555 | A1 | 12/2010 | Vermeulen et al. | |
| 2010/0329607 | A1* | 12/2010 | Drost | G02B 6/30 |
| | | | | 385/37 |
| 2011/0008001 | A1* | 1/2011 | Doerr | G02B 6/12004 |
| | | | | 385/37 |
| 2011/0103743 | A1 | 5/2011 | Baets et al. | |

OTHER PUBLICATIONS

Lim et al., "Low-Cost Coaxial-Type Single TO-can Bidirectional Optical Subassembly," Electronics Letters, vol. 46, No. 23, Nov. 11, 2010, pp. 1-2.

Hashimoto et al., "A 1.3/1.55-μm Wavelength-Division Multiplexing Optical Module Using a Planar Lightwave Circuit for Full Duplex Operation," Journal of Lightwave Technology, vol. 18, No. 11, Nov. 2000, pp. 1541-1547.

Roelkens et al., "Bridging the Gap Between Nanophotonic Waveguide Circuits and Single Mode Optical Fibers Using Diffractive Grating Structures," Journal of Nanoscience and Nanotechnology, vol. 10, 2010, pp. 1551-1562.

Roelkens et al., "Silicon-on-Insulator Ultra-Compact Duplexer Based on a Diffractive Grating Structure," Optical Express, vol. 15, No. 16, Aug. 6, 2007, pp. 10091-10096.

International Preliminary Report on Patentability for International Application No. PCT/SG2014/000441 dated Jan. 21, 2016, pp. 1-22.

\* cited by examiner

US 9,915,787 B2

OPTICAL COUPLING DEVICE, PHOTONIC INTEGRATED CIRCUIT, AND METHOD OF FORMING AN OPTICAL COUPLING DEVICE

CROSS-REFERENCE TO RELATED APPLICATION

This application claims the benefit of priority of Singapore patent application No. 201307267-3, filed 26 Sep. 2013, the content of it being hereby incorporated by reference in its entirety for all purposes.

TECHNICAL FIELD

Various embodiments relate to an optical coupling device, a photonic integrated circuit and a method of forming an optical coupling device.

BACKGROUND

With the increasing popularity of HDTV (high-definition television), 3D (three-dimensional) displays, and peer-to-peer file sharing, the demand for high bandwidth connectivity to the home will continue to grow. Fiber-to-the-Home (FTTH) has grown rapidly world-wide and the Asia Pacific market leadership is expected to continue in the next few years. Recently, the passive optical network (PON) system has been well recognized as a potential FTTH system in terms of its offered capacity and cost. Optical transceivers used for the PON system are bi-directional devices that use different wavelengths to transmit and receive signals between the optical line terminal (OLT) at the central office and the optical network units (ONUs) at the end users' premises over a single fiber. Nowadays, there are different approaches to produce a bidirectional optical transceiver including (1) free space packaging by employing TO-CAN laser diode (LD), APD (avalanche photodiode) and thin film filter; (2) planar lightwave circuit (PLC) with discrete optical components including LD, APD and WDM (wavelength-division multiplexing) filter. In order to reduce the number of discrete components, improve the manufacturing yield, increase the reproduction throughput, and reduce overall cost, highly integrated solutions based on hybrid or monolithic integration are demanded.

Due to the recent inspiring developments, silicon photonics has become a promising technology for low cost optical transceivers with high integration density. Waveguides, optical filters, modulators, and photo-detectors can be integrated by CMOS (complementary metal-oxide-semiconductor) compatible processes on a single silicon chip to fulfill the transceiver's functions. Electrical drivers and amplifiers can be furthermore integrated with the silicon photonics circuit on one chip.

For practical application in an optical transmission system, polarization diversity in a PIC (photonic integrated circuit) is normally required. The most common way to realize polarization independent silicon PIC is to implement a polarization diversity scheme. The transverse electric (TE)- and transverse magnetic (TM)-polarized components of the input light will be split into two paths and then converted to a single polarization so that the polarization dependent structures in the PIC will have identical performance for both paths. This can be realized by using a fiber-to-waveguide grating coupler.

As is known, a grating structure is a narrow band structure. The 3 dB optical coupling bandwidth for a silicon grating coupler is in the order of 50-80 nm. In order to satisfy the multiple wavelength band requirement in transceiver applications, a duplexer grating coupler may be used. However, the conventional 2D (two-dimensional) square lattice diffraction grating has its drawbacks as a building block for optical transceivers. Because of the symmetric grating structure, the four access waveguides are equally assigned to two wavelength channels. But the transmitter part with a single polarized LD output would only require a single access waveguide. Such symmetric grating requires the fiber to be tilted along the symmetry axis in order to realize wavelength duplexing operation, which calls for additional effort to match the projected Bragg condition. Furthermore, in practice, the polarization independence behavior only works over a limited wavelength range.

SUMMARY

According to an embodiment, an optical coupling device is provided. The optical coupling device may include a substrate, and a grating arrangement including a plurality of grating elements, the plurality of grating elements being defined on one surface of the substrate, wherein the plurality of grating elements are arranged to have a first period along a first direction, and a second period along a second direction orthogonal to the first direction, the first period being different from the second period.

According to an embodiment, a photonic integrated circuit is provided. The photonic integrated circuit may include an optical element, and an optical coupling device optically coupled to the optical element and including a substrate, and a grating arrangement including a plurality of grating elements, the plurality of grating elements being defined on one surface of the substrate, wherein the plurality of grating elements are arranged to have a first period along a first direction, and a second period along a second direction orthogonal to the first direction, the first period being different from the second period.

According to an embodiment, a method of forming an optical coupling device is provided. The method may include providing a substrate, and forming a grating arrangement including a plurality of grating elements, the plurality of grating elements being formed on one surface of the substrate, wherein the plurality of grating elements are arranged to have a first period along a first direction, and a second period along a second direction orthogonal to the first direction, the first period being different from the second period.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1A:
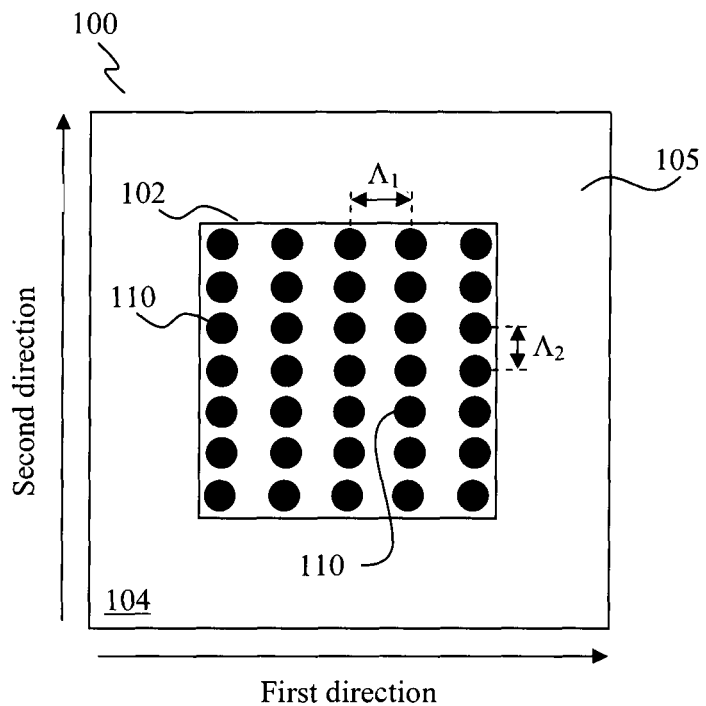
FIG. 1A shows a schematic cross-sectional view of an optical coupling device, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Various embodiments may relate to at least one of optical transceivers, silicon (Si) photonics or fiber-to-chip grating coupler or coupling device.

Various embodiments may provide a two-dimensional (2D) asymmetric silicon waveguide grating (e.g. a 2D asymmetric silicon waveguide grating) for optical transceivers. An asymmetric grating lattice may be employed to achieve desirable asymmetric requirement of optical transceivers. In various embodiments, the periods for the grating in orthogonal waveguide directions may be designed to be different, which may form a grating structure that may provide asymmetric access waveguides for wavelength duplexing performance.

Various embodiments may provide a 2D asymmetric silicon grating with different periods along orthogonal waveguide directions, which may be used to form an integrated optical transceiver on a SOI (silicon-on-insulator) platform. Such a single device may provide the functions of not only coupling between a fiber and waveguides but also wavelength division multiplexing (WDM).

FIG. 1A shows a schematic cross-sectional view of an optical coupling device 100 for coupling light between optical components, according to various embodiments. The optical coupling device 100 includes a substrate 104, and a grating arrangement 102 including a plurality of grating elements (as represented by 110 for two grating elements), the plurality of grating elements 110 being defined on one surface 105 of the substrate 104, wherein the plurality of grating elements 110 are arranged to have a first period, $\Lambda_1$, along a first direction, and a second period, $\Lambda_2$, along a second direction orthogonal to the first direction, the first period, $\Lambda_1$, being different from the second period $\Lambda_2$.

In other words, an optical coupling device or an optical coupler 100 may be provided. The optical coupling device 100 may include a substrate 104, and a grating arrangement 102 having a plurality of grating elements 110 defined or formed on a surface 105 of the substrate 104. The plurality of grating elements 110, and therefore also the grating arrangement 102, may be defined on and/or through the same surface 105 of the substrate 104. In various embodiments, all of the plurality of grating elements 110 may be defined on the surface 105 of the substrate 104.

The grating arrangement 102 may be a two-dimensional (2D) grating arrangement, meaning that the plurality of grating elements 110 may be arranged in a two-dimensional (2D) pattern, for example extending in a first direction (e.g. x-direction in a Cartesian coordinate system) and a second direction (e.g. y-direction in a Cartesian coordinate system). The first direction and the second direction may be at least substantially perpendicular to each other.

In various embodiments, the plurality of grating elements 110 may be arranged to have a first period (or a set of first periods), $\Lambda_1$ or $\Lambda_x$, along the first direction, and a second period (or a set of second periods), $\Lambda_2$ or $\Lambda_y$, along the second direction, where the first period, $\Lambda_1$, being different from the second period, $\Lambda_2$, may be different to each other ($\Lambda_1 \neq \Lambda_2$). This may mean that grating elements 110 of the plurality of grating elements 110 arranged along the first direction may have a first period, $\Lambda_1$, while grating elements 110 of the plurality of grating elements 110 arranged along the second direction may have a second period, $\Lambda_2$, where grating elements 110 arranged or aligned along the first direction has a period that is different from the period of grating elements 110 arranged or aligned along the second direction. According, as the periods of the grating elements 110 along the first and second direction may be different, the grating arrangement 102 may be an asymmetric grating arrangement (e.g. a 2D asymmetric grating arrangement).

The optical coupling device 100 may receive an optical signal or light, for example light may be incident on the optical coupling device 100. Light received by the optical coupling device 110 may be received by the grating arrangement 110. As the plurality of grating elements 110, and therefore also the grating arrangement 102, may be defined on and/or through the same surface 105 of the substrate 104, light may be received at least substantially simultaneously by the plurality of grating elements 110. The optical coupling device 100, and therefore also the grating arrangement 102, may couple light between at least two optical components, e.g. between a waveguide and an optical fiber.

In the context of various embodiments, the term "period" as applied to the first period, $\Lambda_1$, and/or the second period, $\Lambda_2$, may refer to the distance, spacing or separation between adjacent grating elements 110.

In various embodiments, for a uniform or periodic arrangement of the plurality of grating elements 110 along at least one of the first direction or the second direction, the first period, $\Lambda_1$, (second period, $\Lambda_2$) may refer to the uniform period associated with the grating elements 110 arranged along the first direction (second direction).

In various embodiments, for a non-uniform or non-periodic arrangement of the plurality of grating elements 110 along at least one of the first direction or the second direction, the first period, $\Lambda_1$, (the second period, $\Lambda_2$) may collectively refer to the periods (or set of periods) associated with the grating elements 110 arranged along the first direction (second direction).

In various embodiments, the first period, $\Lambda_1$, may be larger than the second period, $\Lambda_2$.

In various embodiments, the first period, $\Lambda_1$, may range from a few hundred nanometers to a few microns (μm). As non-limiting examples, the first period, $\Lambda_1$, may be between about 100 nm and about 10 μm, for example between about 100 nm and about 1 μm, between about 100 nm and about 500 nm, between about 1 μm and about 10 μm, or between about 500 nm and about 1 μm.

In various embodiments, the second period, $\Lambda_2$, may range from a few hundred nanometers to a few microns (μm). As non-limiting examples, the second period, $\Lambda_2$, may be between about 100 nm and about 10 μm, for example between about 100 nm and about 1 μm, between about 100 nm and about 500 nm, between about 1 μm and about 10 μm, or between about 500 nm and about 1 μm.

In various embodiments, at least one of the first period, $\Lambda_1$, or the second period, $\Lambda_2$, may be a uniform (constant) period. This may mean that grating elements 110 arranged along the first direction may be arranged uniformly or in a periodic manner along the first direction and/or grating elements 110 arranged along the second direction may be arranged uniformly or in a periodic manner along the second direction.

In various embodiments, at least one of the first period, $\Lambda_1$, or the second period, $\Lambda_2$, may be a non-uniform (non-constant) period. This may mean that grating elements 110 arranged along the first direction may be arranged non-uniformly or in a non-periodic manner along the first direction and/or grating elements 110 arranged along the second direction may be arranged non-uniformly or in a non-periodic manner along the second direction.

In various embodiments, the first period, $\Lambda_1$, may be a uniform (constant) period and the second period, $\Lambda_2$, may be a non-uniform (non-constant) period, or vice versa.

In various embodiments, the plurality of grating elements 110 may be arranged in a grid-like pattern. For example, the plurality of grating elements 110 may be arranged in a square lattice pattern.

In the context of various embodiments, each grating element 110 of the plurality of grating elements 110 may include a groove, a channel, a projection, a recess, or a cavity (hole).

In various embodiments, the optical coupling device 100 may further include a plurality of input/output ports (I/O ports) optically coupled to the grating arrangement 102. Each I/O port may be an optical port. Each I/O port may be in the form of a waveguide. In various embodiments, light may be coupled between the grating arrangement 102 and a respective I/O port, e.g. light may propagate from the grating arrangement 102 to the respective I/O port or from the respective I/O port to the grating arrangement 102, meaning bi-directional light propagation. In various embodiments, the grating arrangement 102 may be arranged at an intersection of the plurality of input/output ports. As a non-limiting example, there may be four I/O ports, where two I/O ports may be arranged on opposite sides of the grating arrangement 102 along the first direction, and where two other I/O ports may be arranged on opposite sides of the grating arrangement 102 along the second direction.

In the context of various embodiments, the grating arrangement 102 may be configured to optically couple light of different wavelengths or wavelength bands (e.g. 2, 3, 4, or any higher number of wavelengths or wavelength bands) to different input/output ports (I/O ports) of the plurality of input/output ports. This may mean that light of a respective wavelength or wavelength band may be coupled to a respective input/output port. For example, in various embodiments, the grating arrangement 102 may be configured to optically couple light of different wavelengths to opposite input/output ports of the plurality of input/output ports. This may mean that light of a first wavelength or wavelength band may be coupled to an input/output port and light of a second wavelength or wavelength band may be coupled to an opposite input/output port. By reciprocity, light of different wavelengths or wavelength bands from different input/output ports may be optically coupled to the grating arrangement 102.

In various embodiments, the grating arrangement 102 may be configured to optically couple light of a first wavelength towards one side of the grating arrangement 102 and optically couple light of a second wavelength towards one other side (e.g. an opposite side) of the grating arrangement 102, for example provided to opposite input/output ports of the plurality of the input/output ports.

In various embodiments, the grating arrangement 102 may be configured to optically couple light of a predetermined polarization mode (e.g. a transverse electric (TE) mode, or a transverse magnetic (TM) mode) to different input/output ports of the plurality of input/output ports.

In various embodiments, the grating arrangement 102 may be configured to receive light having orthogonal polarization modes and further configured to provide output light of a polarization mode determined from the orthogonal polarization modes towards different sides (e.g. opposite sides) of the grating arrangement 102, for example provided to opposite input/output ports of the plurality of input/output ports.

In the context of various embodiments, the substrate 104 may include silicon (Si). For example, the substrate 104 may be or may include a silicon (Si) substrate/wafer or a silicon-on-insulator (SOI) substrate.

In the context of various embodiments, the grating arrangement 102 may be or may define a diffraction or diffractive grating.

In the context of various embodiments, the grating arrangement 102, and therefore the optical coupling device 100, may be employed to realize wavelength duplexing operation or wavelength multiplexing operation.

Various embodiments may also provide a photonic integrated circuit (PIC) including an optical element, and an optical coupling device optically coupled to the optical element and having a substrate and a grating arrangement including a plurality of grating elements, the plurality of grating elements being defined on one surface of the substrate, wherein the plurality of grating elements are arranged to have a first period along a first direction, and a second period along a second direction orthogonal to the first direction, the first period being different from the second period. The optical coupling device of the photonic integrated circuit may be as described in the context of the optical coupling device 100. The optical element may be an optical fiber, for example.

In various embodiments, the optical coupling device may further include a plurality of input/output ports (I/O ports) optically coupled to the grating arrangement. The grating arrangement may be arranged at an intersection of the plurality of I/O ports. There may be four I/O ports, where two I/O ports may be arranged on opposite sides of the grating arrangement along the first direction, and where two other I/O ports may be arranged on opposite sides of the grating arrangement along the second direction. Each I/O port may be in the form of a waveguide.

In various embodiments, the optical coupling device may further include a plurality of waveguides, where a respective waveguide may be optically coupled to a respective I/O port.

In various embodiments, the optical element may be optically coupled to the grating arrangement, wherein the grating arrangement may be adapted to couple light between the optical element and at least some of the plurality of input/output ports. In various embodiments, the optical element may be arranged tilted relative to the surface of the substrate. This may mean that the optical element may be arranged at a non-zero angle relative to an axis defined perpendicular to the surface of the substrate. The optical element may be arranged tilted such that a surface (e.g. end surface) of the optical element facing the grating arrangement may be arranged non-parallel to an axis defined along the first direction and arranged at least substantially parallel to an axis defined along the second direction.

In various embodiments, the photonic integrated circuit may further include a light source optically coupled to an input/output port of the plurality of input/output ports. The light source may provide light of a single polarization mode (e.g. a transverse electric (TE) mode). For example, the light source may be a laser source, e.g. a laser diode (LD).

In various embodiments, the photonic integrated circuit may further include a detector (e.g. a photodetector; PD) optically coupled to at least some input/output ports of the plurality of input/output ports.

In various embodiments, the photonic integrated circuit may be an optical transceiver.

Figure 1B:
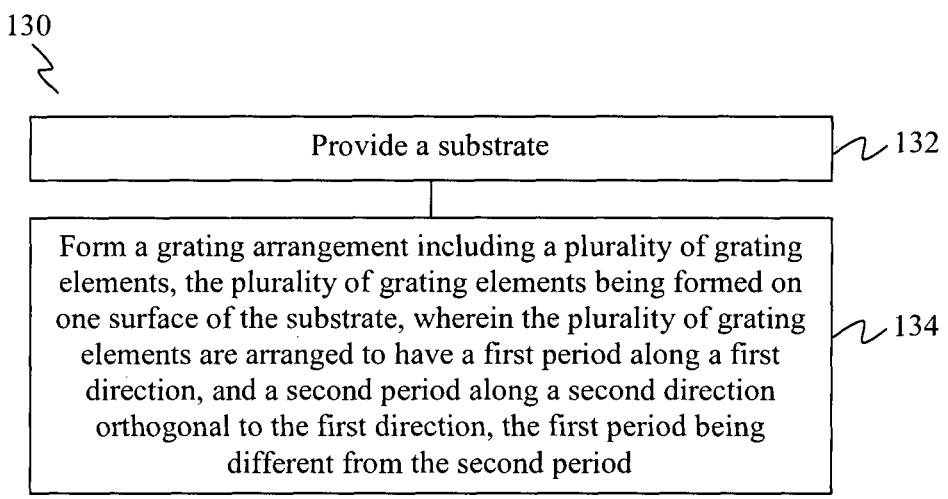
FIG. 1B shows a flow chart illustrating a method of forming an optical coupling device, according to various embodiments.

FIG. 1B shows a flow chart 150 illustrating a method of forming an optical coupling device, according to various embodiments.

At 152, a substrate is provided.

At 154, a grating arrangement including a plurality of grating elements is formed, the plurality of grating elements being formed on one surface of the substrate, wherein the plurality of grating elements are arranged to have a first period along a first direction, and a second period along a second direction orthogonal to the first direction, the first period being different from the second period.

In various embodiments, the method may further include one or more steps for forming one or more features of the optical coupling device, which may be as described in the context of the optical coupling device 100.

The device designs and their associated principles (while not wishing to be bound by any theory) will now be described.

Figure 2A:
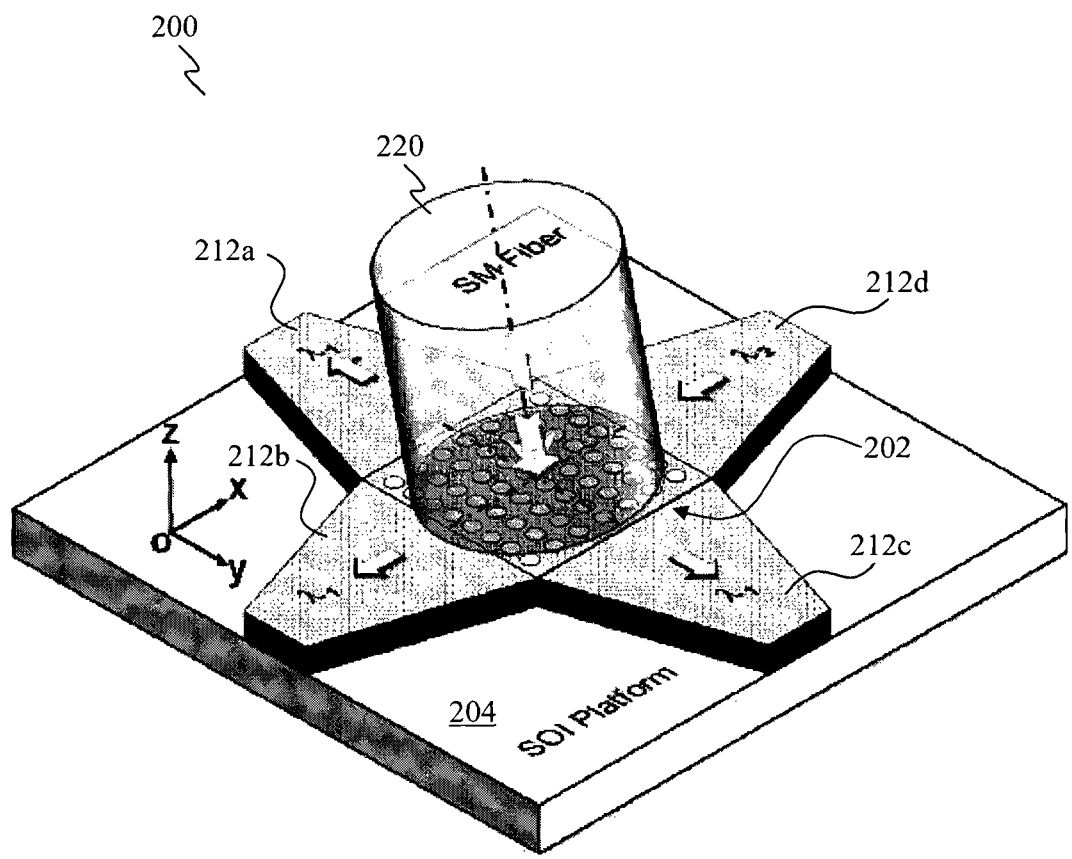
FIGS. 2A and 2B show a schematic perspective view and a schematic top view of an optical coupling device, respectively, according to various embodiments.
Figure 2B:
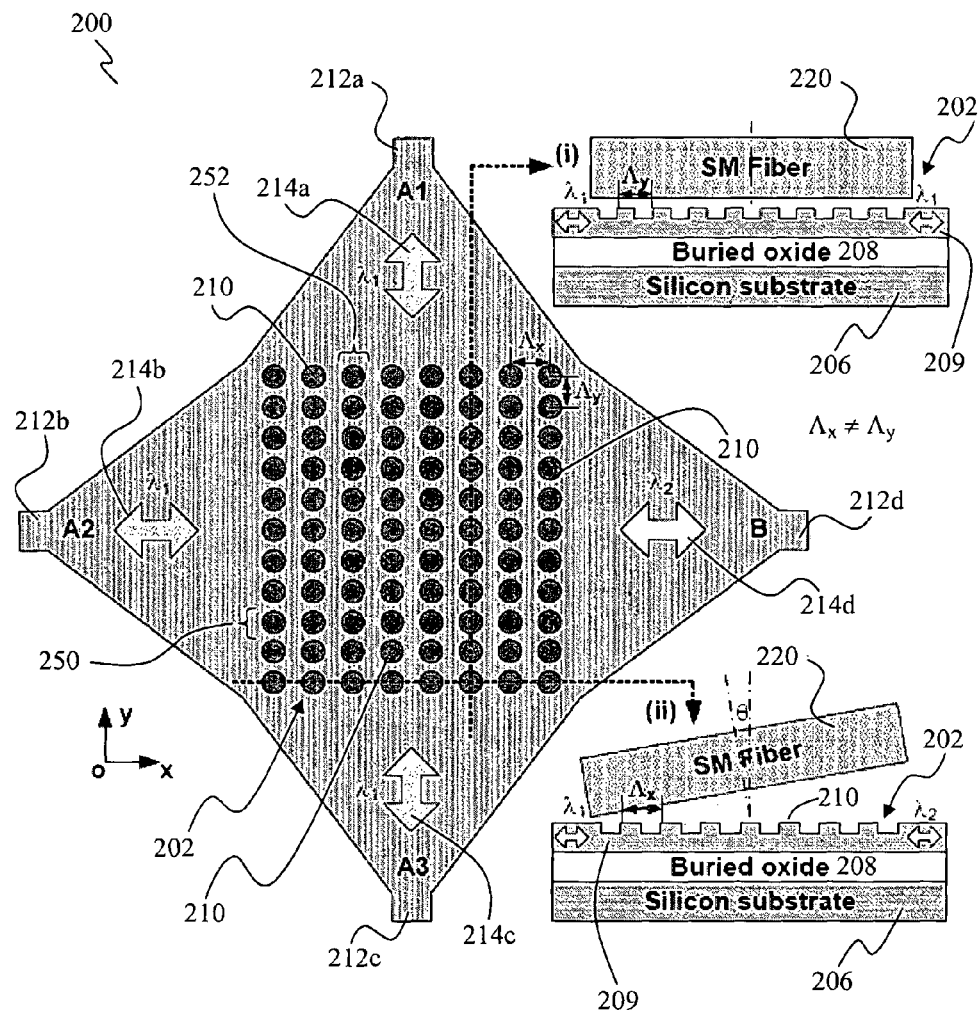

FIGS. 2A and 2B show a schematic perspective view and a schematic top view of an optical coupling device 200, respectively, according to various embodiments. The optical coupling device 200 may include a two-dimensional (2D) asymmetric silicon (Si) waveguide grating 202 for optical transceiver applications. For example, the optical coupling device 200 may include a two-dimensional (2D) asymmetric silicon grating structure 202 to achieve duplexing operation of two widely spaced wavelength bands.

The optical coupling device 200 may be based on a silicon-on-insulator (SOI) platform, meaning that the grating arrangement 202 may be formed or fabricated on an SOI substrate 204 having a silicon base layer 206, a buried oxide (e.g. silicon oxide, $SiO_2$) 208 and a silicon layer 209. The grating arrangement 202 may be formed on a surface of the silicon layer 209. This may also mean that the grating arrangement 202 may be formed on a surface of the SOI substrate 204.

The 2D grating arrangement 202 may include a plurality of grating elements, as represented by 210 for three grating elements in FIG. 2B. The plurality of grating elements 210 may be arranged in a grid-like pattern. The plurality of grating elements 210 may be arranged in rows (indicated as 250 for one row, FIG. 2B), e.g. along the x-direction, and columns (indicated as 252 for one column, FIG. 2B), e.g. along the y-direction. This may mean that each grating element 210 may belong to a row 250 and a column 252. The rows 250 and the columns 252 are at least substantially orthogonal to each other. While FIGS. 2A and 2B shows that the grating elements 210 may be arranged in a square lattice pattern or configuration, it should be appreciated that the grating elements 210 may be arranged in other 2D patterns.

In various embodiments, each grating element 210 may be in the form of a projection on a surface of the SOI substrate 204. Each grating element 210 may have a circular cross-section, thereby forming a cylindrical structure on the surface of the SOI substrate 204, although it should be appreciated that other cross-sectional shapes may be employed.

In various embodiments, grating elements 210 arranged along the x-direction (e.g. first direction) may have a period, $\Lambda_x$, and grating elements 210 arranged along the y-direction (e.g. second direction) may have a period, $\Lambda_y$. The grating periods in othogonal directions, e.g. x-axis or x-direction; y-axis or y-direction, may be designed to be unequal or different ($\Lambda_x \neq \Lambda_y$), which consequently may form a 2D asymmetric lattice grating 202.

The optical coupling device 200 may include a plurality of input/output ports (I/O ports), for example four I/O ports, optically coupled to the grating arrangement 202. For example, the optical coupling device 200 may include a first I/O port (port A1) 212a, a second I/O port (port A2) 212b, a third I/O port (port A3) 212c and a fourth I/O port (port B) 212d. The first I/O port 212a and the third I/O port 212c may be arranged on opposite sides of the grating arrangement 202, for example along the y-direction. The second I/O port 212b and the fourth I/O port 212d may be arranged on opposite sides of the grating arrangement 202, for example along the x-direction. As shown in FIG. 2B, respective optical signals or light (as represented by the double-headed arrows 214a, 214b, 214c, 214d) may be coupled between the grating arrangement 202 and the respective I/O ports 212a, 212b, 212c, 212d bi-directionally. This may mean that an optical signal may propagate from the grating arrangement 202 to the respective I/O port 212a, 212b, 212c, 212d, and/or from the respective I/O port 212a, 212b, 212c, 212d to the grating arrangement 202.

An optical element (e.g. an optical fiber 220, such as a single mode fiber) may be provided optically coupled to the grating arrangement 202 to couple light to the grating arrangement 202 and/or from the grating arrangement 202. For clarity purposes, the optical fiber 220 is not shown in the top view of the optical coupling device 200 in FIG. 2B.

In FIG. 2B, the two insets labelled (i) and (ii) show the cross sectional views taken along the y-axis (or y-direction) and the x-axis (or x-direction) respectively as indicated in FIG. 2B. The fiber 220 may be arranged tilted by an angle, θ, with respect to the vertical axis along the x-direction in the x-z plane. In the y-z plane, the fiber 220 may be arranged at least substantially or perfectly vertical to the y-axis (or an axis defined along the y-direction. This may mean that the fiber 220 may not be tilted with respect to the vertical axis along the y-direction in the y-z plane.

By having the above-mentioned design or arrangement, the phase matching condition may be simply maintained without any specific design on waveguides position, e.g. waveguide tilting in conventional devices.

While in standard fiber-to-waveguide 2D grating couplers only two access waveguide are used, in this duplexer structure of the optical coupling device 200, four access waveguides may be used to expand the wavelength range over which light may be efficiently coupled between a photonic integrated circuit (PIC) (e.g. incorporating the optical coupling device 200) and a single mode optical fiber (e.g. 220). At the same time, duplexing operation for wavelength bands $\lambda_1$ and $\lambda_2$ may be achieved as shown in FIGS. 2A and 2B. The single port B (I/O port 212d) may be designed to provide single polarization input/output for the wavelength band $\lambda_2$, while the other three ports A1-A3 (I/O ports 212a, 212b, 212c) may be designed to realize polarization diversity circuit by coupling the orthogonal polarization states of the light in the optical fiber 202 to identically (e.g. transverse electric modes, TE) polarized modes in orthogonal waveguides for the wavelength band In various embodiments, the access waveguides or waveguides may mean the I/O ports 212a, 212b, 212c, 212d or may be additional waveguides optically coupled to the respective I/O ports 212a, 212b, 212c, 212d.

In various embodiments, along the x-axis (or x-direction), the grating or grating arrangement 202 may act as a wavelength duplexer to separate two wavelength bands (e.g. $\lambda_1$ and $\lambda_2$) in opposite waveguide directions, e.g. towards I/O port 212b and I/O port 212d respectively. It should be appreciated that the fiber tilt angle, θ, may be designed to fit different wavelength bands composition on different platforms. Along the y-axis (or y-direction), the grating arrangement (e.g. 2D asymmetric grating) 202 may simply act as a coupler to couple a single wavelength signal to waveguides, e.g. towards I/O port 212a and I/O port 212c respectively.

As described above, the grating arrangement 202, in the form of a 2D asymmetric waveguide grating, may be employed to realize wavelength duplexing operation. The periods in the x-direction ($\Lambda_x$) and the y-direction ($\Lambda_y$) may be designed to be different. The optical fiber 220 may be tilted a certain degree, θ, in the x-z plane to realize wavelength duplexing. Optical signals of respective wavelengths or wavelength bands $\lambda_1$ and $\lambda_2$ may be separated in opposite directions from the grating arrangement 202. The optical fiber 220 may be placed at least substantially or perfectly vertically in the y-z plane, which may simplify the phase matching condition for the 2D grating coupler 202. Further, the 2 orthogonal polarization states of the light in the optical fiber 202 with the wavelength $\lambda_1$ may be coupled via the grating arrangements into different I/O ports or waveguides with the same polarization, which therefore may form a polarization diversity circuit.

Figure 3:
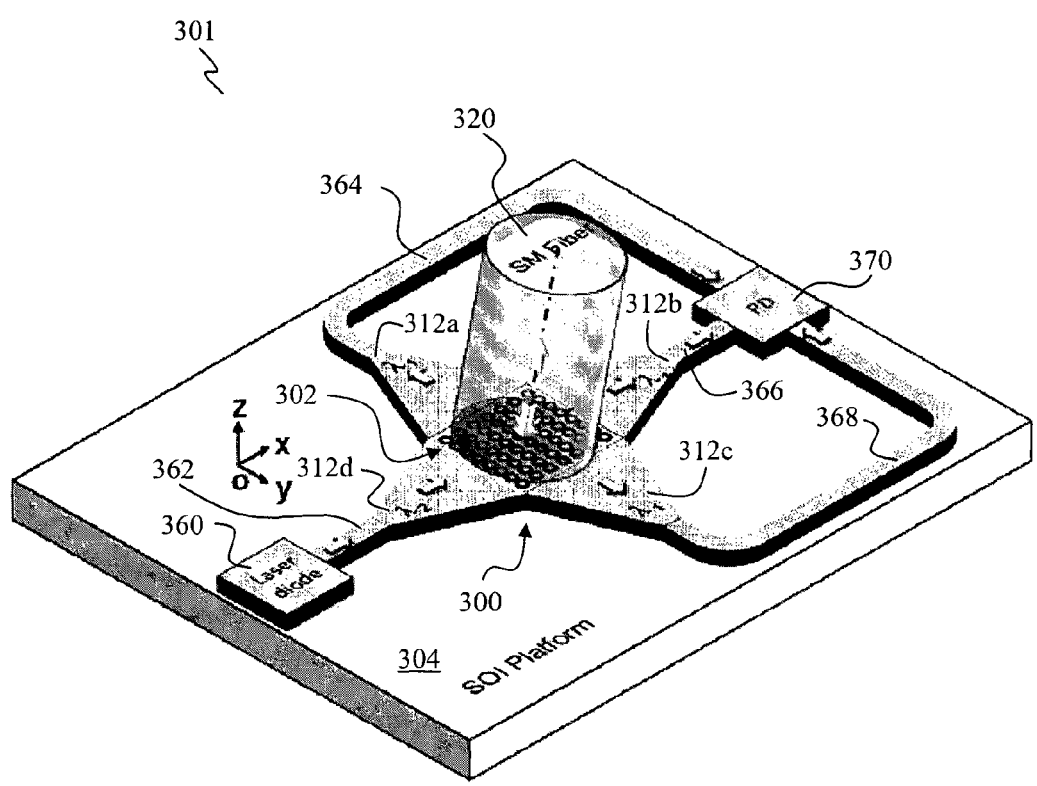
FIG. 3 shows a schematic perspective view of a photonic integrated circuit, according to various embodiments.

In various embodiments, the 2D asymmetric grating duplexer or coupling device 200 may be used in or as part of an optical transceiver. FIG. 3 shows a schematic perspective view of a photonic integrated circuit (PIC) 301, according to various embodiments. The photonic integrated circuit 301 may include an optical coupling device 300 having a grating arrangement (e.g. a 2D asymmetric waveguide grating) 302 formed on a SOI substrate/platform 304, which may be as described in the context of the optical coupling device 200 (FIGS. 2A and 2B). A plurality of I/O ports 312a, 312b, 312c, 312d may be provided optically coupled to the grating arrangement 302. The photonic integrated circuit 301 may be employed for optical transceivers using the grating arrangement 302, for example in the form of a 2D asymmetric waveguide grating.

The I/O port 312d may be connected to or optically coupled to a light source (e.g. a laser diode, LD) 360, e.g. either directly or by means of a waveguide 362. The light source 360 may provide an optical signal or light with a single polarization, e.g. in transverse electric (TE) mode, to the I/O port 312d. The optical signal may have an associated wavelength or wavelength band, $\lambda_2$. The remaining or three other I/O ports 312a, 312b, 312c may be connected to or optically coupled to a photodetector (PD) 370, e.g. either directly or by means of respective waveguides 364, 366, 368. Respective optical signals from the I/O ports 312a, 312b, 312c may have a different associated wavelength or wavelength band, $\lambda_1$. This may mean that the photodetector 370 may work on a wavelength (or wavelength band) different from the wavelength (or wavelength band) associated with the light provided by the light source 360. This may mean that, as shown in FIG. 3, a single port (e.g. I/O port 312d) may be connected to the laser diode (LD) 360 or the laser diode output, which normally has single polarization (e.g. TE) (meaning a TE polarized (in-plane) optical signal) on a particular wavelength band, while the other three ports (e.g. I/O ports 312a, 312b, 312c) may be connected to the photodetector 370 working on another wavelength band (meaning polarization diversity of the input light). The signal or signals for detection at the photodetector side may be combined at an electronic layer or in an electronic circuit, which may be provided (e.g. integrated) with the photonic integrated circuit 301.

An optical fiber (e.g. a single mode fiber) 320 may also be arranged optically coupled to the optical coupling device 300 to couple light to or from the grating arrangement 302. The optical fiber 320 may be arranged tilted as described in the context of the optical coupling device 200 (FIGS. 2A and 2B).

Figure 4:
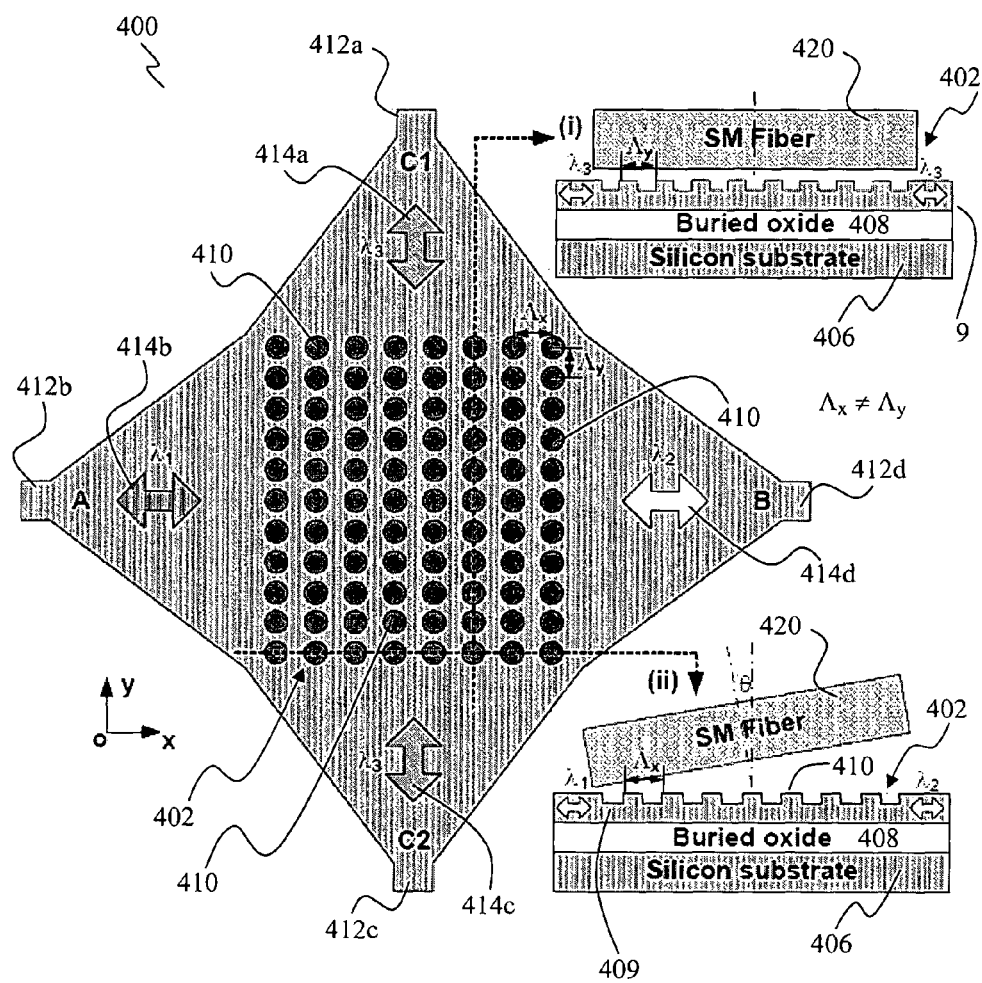
FIG. 4 shows a schematic top view of an optical coupling device, respectively, according to various embodiments.

FIG. 4 shows a schematic top view of an optical coupling device 400, respectively, according to various embodiments, illustrating a grating arrangement (e.g. a 2D asymmetric waveguide grating) 402 for three wavelength bands multiplexing. Accordingly, the optical coupling device 400, including at least some of its associated features and/or some of its associated operation, may be as described in the context of the optical coupling device 200 (FIGS. 2A and 2B). The grating arrangement 402 may be formed or fabricated on an SOI substrate having a silicon base layer 406, a buried oxide (e.g. silicon oxide, $SiO_2$) 408 and a silicon layer 409.

The optical coupling device 400 may include a grating arrangement 402 having a plurality of grating elements, as represented by 410 for three grating elements, which may be arranged in a square lattice pattern. Each grating element 410 may be in the form of a projection on a surface of the SOI substrate. for example in the form of a cylindrical structure having a circular cross-section. Grating elements 410 arranged along the x-direction may have a period, Λ, and grating elements 210 arranged along the y-direction may have a period, $\Lambda_y$, where these periods may be different to each other, meaning $\Lambda_x \neq \Lambda_y$. In such a way, a 2D asymmetric lattice grating 402 may be formed. The grating periods, $\Lambda_y$, associated with the grating elements 410 in the y-direction may be designed so as to enable the grating arrangement 402 to be operable for three wavelengths or wavelength bands.

In various embodiments, the grating periods, $\Lambda_y$, associated with the grating elements 410 in the y-direction for the grating arrangement 402 for operation with three wavelengths or wavelength bands, may be different from the grating periods, $\Lambda_y$, associated with the grating elements 210 in the y-direction for the grating arrangement 202 for operation with two wavelengths or wavelength bands. As a non-limiting example, the grating period, Λ, may satisfy the phase matching condition: $q\lambda = \Lambda(n_{eff} - n_c \sin \theta)$, where X is the center wavelength, $n_{eff}$ is the effective index of the grating, $n_c$ is the refractive index of the cladding material, θ is the off-vertical tilt angle of the fiber (e.g. 420), q is the diffraction order (which may be equal to 1 for most grating couplers). For three wavelengths operation, $\lambda_3$, as indicated in FIG. 4 along the y-direction, is different to $\lambda_1$ (one of the wavelengths for two wavelength operation), as indicated in FIG. 2B along the y-direction, which therefore may result in the $\lambda_y$ difference.

The optical coupling device 400 may include a plurality of input/output ports (I/O ports), for example four I/O ports, optically coupled to the grating arrangement 402. For example, the optical coupling device 400 may include a first I/O port (port C1) 412a, a second I/O port (port A) 412b, a third I/O port (port C2) 412c and a fourth I/O port (port B) 412d. The first I/O port 412a and the third I/O port 412c may be arranged on opposite sides of the grating arrangement 402, for example along the y-direction. The second I/O port 412b and the fourth I/O port 412d may be arranged on opposite sides of the grating arrangement 402, for example along the x-direction.

As shown in FIG. 4, respective optical signals or light (as represented by the double-headed arrows 414a, 414b, 414c, 414d) may be coupled between the grating arrangement 402 and the respective I/O ports 412a, 412b, 412c, 412d bi-directionally. An optical signal having an associated wavelength (or wavelength band) $\lambda_1$ may be coupled between the grating arrangement 402 and the second I/O port 412b, an optical signal having an associated wavelength (or wavelength band) $\lambda_2$ may be coupled between the grating arrangement 402 and the fourth I/O port 412d, while respective optical signals having an associated wavelength (or wavelength band) $\lambda_3$ may be coupled between the grating arrangement 402 and the first and third I/O ports 412a, 412c.

An optical element (e.g. an optical fiber 420, such as a single mode fiber) may be provided optically coupled to the grating arrangement 202 to couple light to the grating arrangement 402 and/or from the grating arrangement 402. In FIG. 4, the two insets labelled (i) and (ii) show the cross sectional views taken along the y-axis (or y-direction) and the x-axis (or x-direction) respectively as indicated in FIG. 4. Similar to the arrangement of the optical fiber 220 as described in the context of the optical coupling device 200, the fiber 420 may be arranged tilted by an angle, θ, with respect to the vertical axis along the x-direction in the x-z plane, while in the y-z plane, the fiber 420 may be arranged at least substantially or perfectly vertical to the y-axis (or an axis defined along the y-direction).

As may be appreciated, the same grating structure or arrangement (e.g. a 2D asymmetric waveguide grating) as in the optical coupling device 200 may be designed for operation with three wavelength bands by purposely designing the grating periods, $\Lambda_y$, in the y-axis (or y-direction). Such a feature cannot be realized by using conventional 2D grating designs, such as a conventional 2D square lattice grating design.

Simulations results using the optical coupling device 200 (FIGS. 2A and 2B) will now be described by way of the following non-limiting examples.

Two-dimensional finite-difference time-domain (FDTD) simulations may be used for the grating structures or arrangements of various embodiments. A Gaussian waveform with 1/e full width of about 10.4 μm may be employed to represent the fiber mode input. Coupling efficiency between the fiber 220 and a waveguide (e.g. one of the I/O ports) may be calculated using the power in the waveguide mode coming out from the front end of the grating coupler or grating arrangement 202. The "front end" of the grating arrangement may mean the row or column of grating elements 210 located closest to the respective I/O port.

During simulations, the fiber position, which may be the horizontal distance from the center of the fiber core to the front-end of the grating coupler, may be adjusted to maximize the coupler efficiency. As a non-limiting example, 1310 nm and 1490 nm may be chosen as the two wavelength bands to illustrate the functionality of the grating arrangement 202 and the optical coupling device 200.

Figure 5:
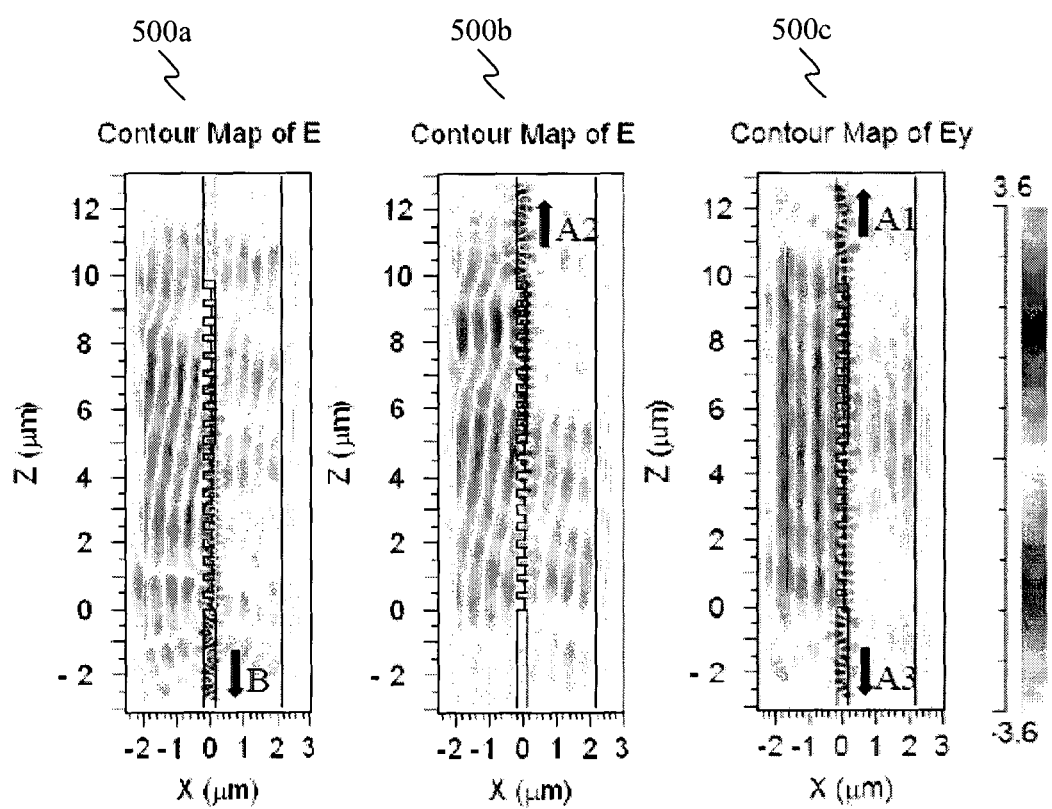
FIG. 5 shows the finite-difference time-domain (FDTD) simulated mode field patterns using the grating arrangement of various embodiments at the wavelengths of 1310 nm and 1490 nm in different waveguide directions.

FIG. 5 shows the finite-difference time-domain (FDTD) simulated mode field patterns using the grating arrangement (e.g. 2D asymmetric grating design) 202 of various embodiments, illustrating the results for a duplexer grating arrangement or structure. FIG. 5 shows the simulated mode field pattern 500a at the wavelength of about 1310 nm and the simulated mode field patterns 500b, 500c at the wavelength of about 1490 nm, in different waveguide or I/O port directions. The results in FIG. 5 clearly illustrate the duplexing behavior of the diffractive grating arrangement 202 for both wavelength channels (mode field patterns 500a, 500b) and polarization diversity for the 1490 nm wavelength (mode field pattern 500c).

Figure 6:
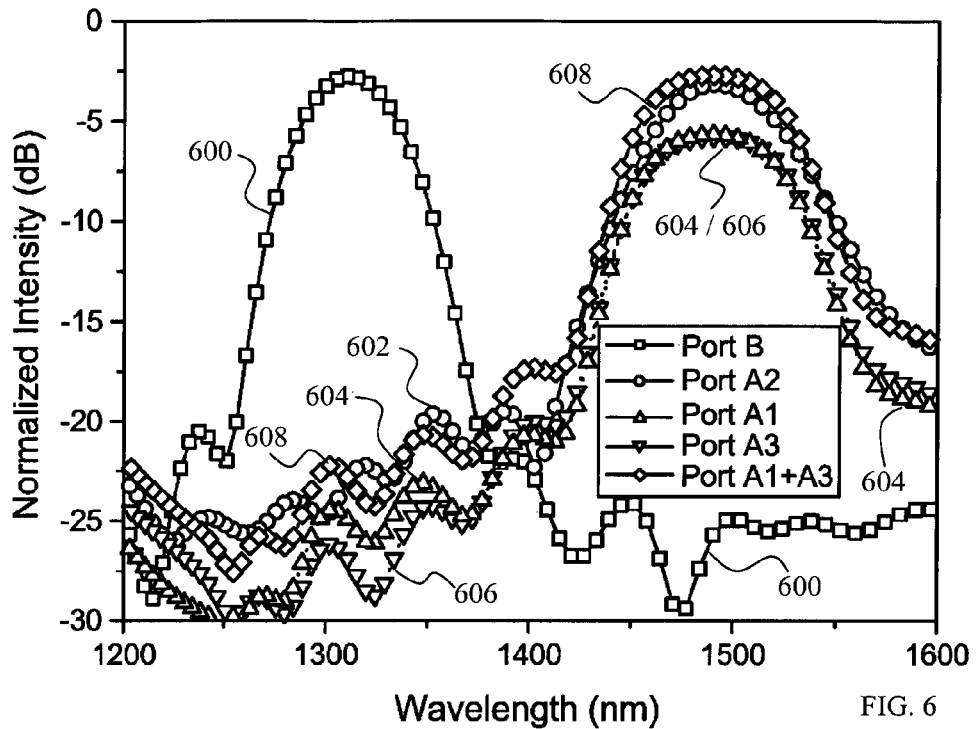
FIG. 6 shows a plot of the coupling loss spectra for the wavelength channels at 1310 nm and 1490 nm at different input/output ports of the optical coupling device.

FIG. 6 shows a plot of the coupling loss spectra for the wavelength channels at 1310 nm and 1490 nm at different input/output ports of the optical coupling device (or 2D asymmetric grating coupler) 200. FIG. 6 shows results 600 corresponding to the fourth I/O port (port B) 212d, results 602 corresponding to the second I/O port (port A2) 212b, results 604 corresponding to the first I/O port (port A1) 212a, results 606 corresponding to the third I/O port (port A3) 212c, and results 608 corresponding to the combination of the first and third I/O ports (ports A1+A3) 212a and 212c. Approximately −2.8 dB (fourth I/O port or port B 212d) coupling efficiency may be obtained for the wavelength at about 1310 nm, and approximately −5.6 dB (first I/O port or port A1 212a; third I/O port or port A3 212c), approximately −2.7 dB (combination of the first and third I/O ports or ports A1+A3, 212a and 212c), and approximately −3.1 dB (second I/O port or port A2 212b) may be obtained for the wavelength at about 1490 nm. The 3 dB bandwidth for the 1310 nm and 1490 nm wavelength bands may be approximately 54 nm and 73 nm respectively. The crosstalk between both wavelength channels at 1310 nm and 1490 nm may be below approximately −20 dB. The wavelength duplexing behavior may clearly be observed from the results shown in FIG. 6. As may also be observed from FIG. 6, polarization diversity may be realized for one wavelength band (e.g. 1490 nm) at the first I/O port 212a, second I/O port 212b and third I/O port A3 212c (ports A1-A3).

Figure 7:
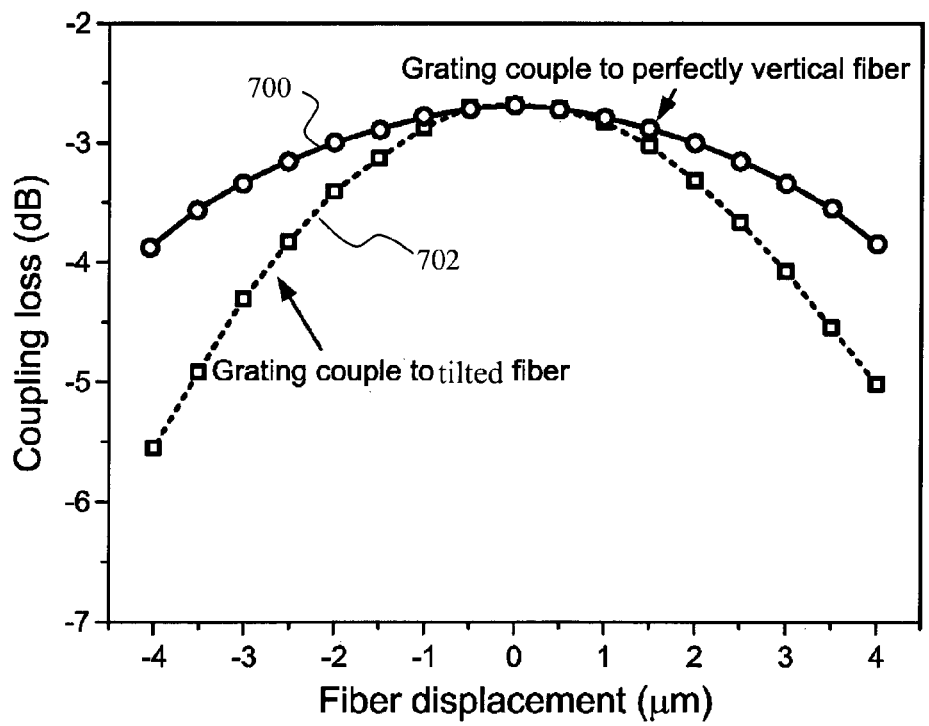
FIG. 7 shows a plot of simulated fiber displacement tolerance with different grating coupler designs.

FIG. 7 shows a plot of FDTD simulated fiber displacement tolerance with different grating coupler designs. FIG. 7 shows the result 700 for a grating arrangement (asymmetric grating arrangement) of various embodiments with an optical fiber vertically aligned to the y-axis or y-direction in the y-z plane, e.g. FIG. 2A, FIG. 2B inset (i), and the result 702 for a conventional symmetric grating with an optical fiber tilted to the grating. The results illustrated in FIG. 7 show that the optical coupling device having an asymmetric grating arrangement of various embodiments may have a much larger alignment tolerance along the y-axis (or y-direction) as compared to a conventional symmetric grating design (e.g. a conventional 2D square lattice grating), which becomes a significant advantage for optical transceiver design using waveguide gratings. Therefore, in various embodiments, the alignment tolerance along the y-axis may be significantly relaxed. Much less power penalty may be observed for the optical coupling device of various embodiments within the same fiber displacement range.

As described above, various embodiments may provide a two-dimensional (2D) asymmetric silicon waveguide grating or grating arrangement. The 2D asymmetric waveguide grating arrangement may have different grating periods and unbalanced ports allocation. The grating arrangement may provide a simple structure to realize both functionalities of coupling and WDM filtering. The grating arrangement and the optical coupling device of various embodiments may be cost-effective, capable of being employed for high density photonic integration, and may be transferred to the mass production line. The grating may be fabricated by CMOS-compatible technology and the fabrication process may be straightforward. A photonic integrated circuit (PIC) design for optical transceiver using the grating arrangement (e.g. 2D asymmetric grating structure) of various embodiments may also be provided. Various embodiments may provide a significant industrial impact on PIC application on optical transceivers for telecommunications.

The symmetry for a conventional grating coupler is broken, where in various embodiments, the grating periods in perpendicular directions are set to be unequal. The 2D asymmetric grating arrangement or structure of various embodiments with different periods in orthogonal directions may be applicable for wavelength duplexing and wavelength multiplexing. The asymmetric design of the grating arrangement may enable asymmetric outputs for different wavelength or wavelength bands.

As described above, for achieving a duplexing operation, an optical fiber arranged optically coupled to the grating arrangement may be tilted along one direction (e.g. the x-axis) of the grating arrangement. A plurality of input/output ports (I/O ports), for example a total of 4 input/output ports, may be connected or optically coupled to the grating arrangement (or grating coupler). The ports may be divided into two sets, for example one set having one I/O port and the other set having three I/O ports. Unlike the conventional design, one port (e.g. port B 212d, FIGS. 2A and 2B) may be assigned to one wavelength channel, while the other three ports (e.g. ports A1-A3 212a, 212b, 212c, FIGS. 2A and 2B) may be assigned to another wavelength channel in order to realize a polarization diversity circuit. The single port (e.g. port B 212d, FIGS. 2A and 2B) may be used for single polarization input/output for a wavelength band. This port may be used to connect or optically couple a laser diode output, which normally has a single polarization mode (e.g. TE). The other three ports (e.g. ports A1-A3 212a, 212b, 212c, FIGS. 2A and 2B) may be used for polarization independent operation for another wavelength band. The two orthogonal polarization states of light in the optical fiber may be coupled via the grating arrangement (diffraction grating) into the TE-polarized modes of silicon waveguides, which may be the three I/O ports or additional respective waveguides optically coupled to the respective I/O ports. In various embodiments, the optical fiber may be aligned perpendicular along an orthogonal direction (e.g. the y-axis), and as such, light may propagate along the y-axis in opposite directions, towards opposite I/O ports (e.g. port A1 212a and port A3 212c, FIGS. 2A and 2B). The total power of the opposite ports along the orthogonal direction (e.g. port A1 212a and port A3 212c, FIGS. 2A and 2B) may have a large tolerance to fiber displacement along the orthogonal direction (e.g. the y-axis).

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical coupling device for coupling light between optical components, the optical coupling device comprising:
a substrate; and
a grating arrangement comprising a plurality of grating elements, the plurality of grating elements being defined on one surface of the substrate; and
a plurality of input/output ports optically coupled to the grating arrangement, wherein the grating arrangement is arranged at an intersection of the plurality of input/output ports,
a detector on the substrate;
a plurality of waveguides, a first waveguide of the plurality of waveguides connecting the detector to a first port of the plurality of input/output ports and a second waveguide of the plurality of waveguides connecting the detector to a second port of the plurality of input/output ports;
wherein the plurality of grating elements are arranged uniformly to have a first period along a first direction, and arranged uniformly to have a second period along a second direction orthogonal to the first direction, the first period being different from the second period,
wherein the first waveguide is along the first direction and the second waveguide is along the second direction; and
wherein two input/output ports of the plurality of input/output ports are arranged on opposite sides of the grating arrangement along the first direction, and two other input/output ports of the plurality of input/output ports are arranged on opposite sides of the grating arrangement along the second direction.

2. The optical coupling device as claimed in claim 1, wherein the first period is between about 100 nm and about 10 μm.

3. The optical coupling device as claimed in claim 2, wherein the second period is between about 100 nm and about 10 µm.

4. The optical coupling device as claimed in claim 1, wherein the plurality of grating elements are arranged in a grid-like pattern.

5. The optical coupling device as claimed in claim 1, wherein each grating element of the plurality of grating elements comprises a groove, a channel, a projection, a recess, or a cavity.

6. The optical coupling device as claimed in claim 1, wherein the grating arrangement is configured to optically couple light of a first wavelength towards one side of the grating arrangement and optically couple light of a second wavelength towards one other side of the grating arrangement.

7. The optical coupling device as claimed in claim 1, wherein the grating arrangement is configured to receive light having orthogonal polarization modes and further configured to provide output light of a polarization mode determined from the orthogonal polarization modes towards different sides of the grating arrangement.

8. The optical coupling device as claimed in claim 1, wherein the substrate comprises silicon.

9. A photonic integrated circuit comprising:
an optical element; and
an optical coupling device optically coupled to the optical element and comprising:
a substrate; and
a grating arrangement comprising a plurality of grating elements, the plurality of grating elements being defined on one surface of the substrate; and
a plurality of input/output ports optically coupled to the grating arrangement, wherein the grating arrangement is arranged at an intersection of the plurality of input/output ports,
a detector on the substrate;
a plurality of waveguides, a first waveguide of the plurality of waveguides connecting the detector to a first port of the plurality of input/output ports and a second waveguide of the plurality of waveguides connecting the detector to a second port of the plurality of input/output ports;
wherein the plurality of grating elements are arranged uniformly to have a first period along a first direction, and arranged uniformly to have a second period along a second direction orthogonal to the first direction, the first period being different from the second period,
wherein the first waveguide is along the first direction and the second waveguide is along the second direction; and
wherein two input/output ports of the plurality of input/output ports are arranged on opposite sides of the grating arrangement along the first direction, and two other input/output ports of the plurality of input/output ports are arranged on opposite sides of the grating arrangement along the second direction.

10. The photonic integrated circuit as claimed in claim 9, wherein the optical element is optically coupled to the grating arrangement, wherein the grating arrangement is adapted to couple light between the optical element and at least some of the plurality of input/output ports.

11. The photonic integrated circuit as claimed in claim 10, wherein the optical element is arranged tilted relative to the surface of the substrate.

12. The photonic integrated circuit as claimed in claim 9, further comprising a light source optically coupled to an input/output port of the plurality of input/output ports.

13. The photonic integrated circuit as claimed in claim 9, wherein the photonic integrated circuit is an optical transceiver.

14. A method of forming an optical coupling device, the method comprising:
providing a substrate;
forming a grating arrangement comprising a plurality of grating elements, the plurality of grating elements being formed on one surface of the substrate; and
forming a plurality of input/output ports optically coupled to the grating arrangement, wherein the grating arrangement is arranged at an intersection of the plurality of input/output ports,
forming a detector on the substrate;
forming a plurality of waveguides, a first waveguide of the plurality of waveguides connecting the detector to a first port of the plurality of input/output ports and a second waveguide of the plurality of waveguides connecting the detector to a second port of the plurality of input/output ports;
wherein the plurality of grating elements are arranged uniformly to have a first period along a first direction, and arranged uniformly to have a second period along a second direction orthogonal to the first direction, the first period being different from the second period,
wherein the first waveguide is along the first direction and the second waveguide is along the second direction; and
wherein two input/output ports of the plurality of input/output ports are arranged on opposite sides of the grating arrangement along the first direction, and two other input/output ports of the plurality of input/output ports are arranged on opposite sides of the grating arrangement along the second direction.

15. The optical coupling device as claimed in claim 6, wherein the one side and the other side of the grating arrangement are opposite sides of the grating arrangement along the first direction.

16. The optical coupling device as claimed in claim 15, wherein the grating arrangement is further configured to optically couple light of a third wavelength towards opposite sides of the grating arrangement along the second direction.

17. The photonic integrated circuit as claimed in claim 11, wherein the optical element comprises an end surface facing the grating arrangement,
wherein, for a first cross-sectional plane of the optical element wherein the first cross-sectional plane is defined along the first direction and a third direction that is orthogonal to the first direction and the second direction, the end surface is arranged non-parallel to an axis defined along the first direction, and
wherein, for a second cross-sectional plane of the optical element wherein the second cross-sectional plane is defined along the second direction and the third direction, the end surface is arranged at least substantially parallel to an axis defined along the second direction.

* * * * *